(12) United States Patent
Chen et al.

(10) Patent No.: US 10,429,552 B2
(45) Date of Patent: Oct. 1, 2019

(54) OPTICAL SHEET HAVING A COMPOSITE STRUCTURE THEREON AND METHOD TO MAKE THE SAME

(71) Applicant: UBRIGHT OPTRONICS CORPORATION, Taoyuan County (TW)

(72) Inventors: Hui-Yong Chen, Taoyuan County (TW); Lung-Pin Hsin, Taoyuan County (TW); Ching-An Yang, Taoyuan County (TW); Yu-Mei Juan, Taoyuan County (TW); Chien-Chih Lai, Taoyuan County (TW); Tzu-Hsiang Huang, Taoyuan County (TW)

(73) Assignee: UBRIGHT OPTRONICS CORPORATION, Taoyuan (TW)

( * ) Notice: Subject to any disclaimer, the term of this patent is extended or adjusted under 35 U.S.C. 154(b) by 305 days.

(21) Appl. No.: 15/213,420

(22) Filed: Jul. 19, 2016

(65) Prior Publication Data

US 2017/0329058 A1 Nov. 16, 2017

Related U.S. Application Data

(60) Provisional application No. 62/336,761, filed on May 16, 2016.

(51) Int. Cl.
*B29D 11/00* (2006.01)
*G02B 5/02* (2006.01)
*G02B 27/00* (2006.01)

(52) U.S. Cl.
CPC ...... *G02B 5/0268* (2013.01); *B29D 11/00278* (2013.01); *B29D 11/00788* (2013.01); *G02B 5/0226* (2013.01); *G02B 5/0231* (2013.01); *G02B 27/0025* (2013.01)

(58) Field of Classification Search
None
See application file for complete search history.

(56) References Cited

U.S. PATENT DOCUMENTS

| 2005/0180690 A1* | 8/2005 | Sugiyama | B29C 33/3842 385/33 |
| 2011/0100827 A1* | 5/2011 | Hayashi | G02B 1/118 205/112 |
| 2012/0200932 A1* | 8/2012 | Minari | B29C 33/424 359/601 |

(Continued)

OTHER PUBLICATIONS

Lu et al., "Ultrafast Tool Servos for Diamond Turning", CIRP Annals, vol. 54, Issue 1, 2005, pp. 383-388. (Year: 2005).*

*Primary Examiner* — Lisa L Herring
(74) *Attorney, Agent, or Firm* — Min-Lee Teng; Litron Patent & Trademark Office (57) ABSTRACT

The present invention discloses a method of forming an optical sheet. The method comprises: providing a mold having a first surface; forming a plurality of first concave shapes on the first surface of the mold such that the first surface of the mold is changed to a second surface of the mold; forming a plurality of second shapes on the plurality of first concave shapes such that the second surface of the mold is changed to a third surface of the mold; and using the third surface of the mold to emboss a film on a substrate to form a composite structure corresponding to the combination of the plurality of first concave shapes and the plurality of second shapes.

17 Claims, 6 Drawing Sheets

(56) References Cited

U.S. PATENT DOCUMENTS

2012/0213971 A1* 8/2012 Ihara ..................... C25D 11/12
  428/156
2013/0040073 A1* 2/2013 Pett ......................... C08J 7/123
  427/596

* cited by examiner

OPTICAL SHEET HAVING A COMPOSITE STRUCTURE THEREON AND METHOD TO MAKE THE SAME

CROSS-REFERENCE TO RELATED APPLICATION

This application claims the benefit of U.S. provisional patent application No. 62/336,761, filed on May 16, 2016, which is hereby incorporated herein by reference.

BACKGROUND OF THE INVENTION

1. Field of the Invention

The present invention relates to an optical sheet, and more particularly to an optical sheet having a composite structure thereon.

2. Description of Related Art

The aim in the development of the LCD (liquid crystal display) is to pursue lightness, thinness and high resolution. That is, the brightness of the backlight module needs to be improved and the thickness of the backlight module needs to be minimized. When the elements of the backlight module are changed from "the top diffusing sheet/the top prism sheet/the bottom prism sheet/the bottom diffusing sheet" to "the top prism sheet/the bottom prism sheet/the bottom diffusing sheet", it is easy to see Newton's ring. Newton's ring results from light interference between two adjacent interfaces and often occurs between the bottom polarizing sheet and the top prism sheet or between the top prism sheet and the bottom prism sheet. Newton's rings between the top prism sheet and the bottom prism sheet can be classified into two types: transmissive Newton's ring resulting from the incident backlight and reflective Newton's ring resulting from the incident environment light. The surface configuration of the backside structure of the top prism sheet can be optimized to destroy the interference of the incident backlight and the incident environment light so as to eliminate Newton's ring.

The backside structure of the top prism sheet is generally formed by embossing and photo cure. There are two methods for manufacturing the backside structure of the prism sheet: the FTS (Fast Tool Server) process and the sandblasting process.

Figure 1A:
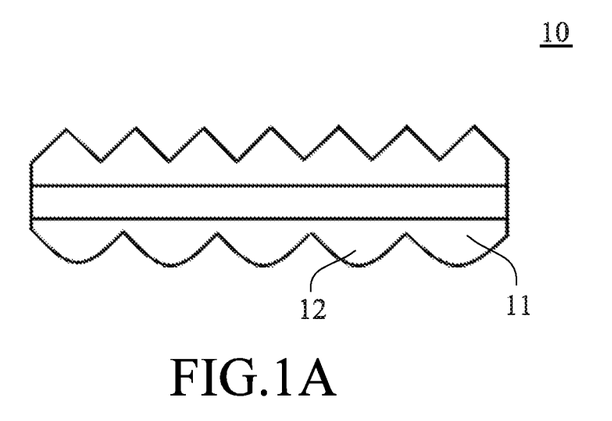
FIG. 1A illustrates a schematic cross-sectional view of the backside structure of the prism sheet formed by the FTS process.

FIG. 1A illustrates a schematic cross-sectional view of the backside structure 11 of the prism sheet 10 formed by the FTS process. By the FTS process, each convex lump 12 of the backside structure 11 of the prism sheet 10 is smoothly-curved and thus the loss of the brightness is slighter; however, because the density of the convex lumps 12 is smaller, Newton's ring (especially reflective Newton's ring) is not completely eliminated. The haze of the convex lumps 12 formed by FTS process is about 10%. Because the convex lumps 12 formed by FTS process are more regular, Newton's ring easily occurs. In order to eliminate Newton's ring, the haze of the surface must be increased to be not small than 30%; however, the haze increases a lot and the brightness drops.

Figure 1B:
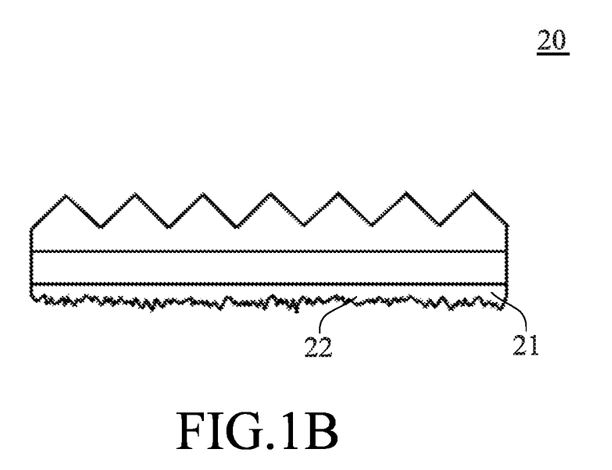
FIG. 1B illustrates a schematic cross-sectional view of the backside structure of the prism sheet formed by the sandblasting process.

FIG. 1B illustrates a schematic cross-sectional view of the backside structure 21 of the prism sheet 20 formed by the sandblasting process. By the sandblasting process, the density of the convex lumps 22 is larger to have better ability of eliminating Newton's ring; however, because the surface of the backside structure 21 of the prism sheet 20 is coarser, the haze increases and the brightness drops a lot.

Accordingly, the present invention proposes an optical sheet having a composite structure thereon and its manufacturing method to overcome the above-mentioned disadvantages.

SUMMARY OF THE INVENTION

The present invention provides an optical sheet and a method for manufacturing the optical sheet which has better anti-Newton's ring performance (especially eliminate reflective Newton's ring) and better brightness performance.

In one embodiment, the present invention discloses a method of forming an optical sheet, comprising: providing a mold having a first surface; forming a plurality of first concave shapes on the first surface of the mold such that the first surface of the mold is changed to a second surface of the mold; forming a plurality of second shapes on the plurality of first concave shapes such that the second surface of the mold is changed to a third surface of the mold; and using the third surface of the mold to emboss a film on a substrate to form a composite structure corresponding to the combination of the plurality of first concave shapes and the plurality of second shapes.

In one embodiment, the present invention discloses a method of forming a method of forming an optical sheet, comprising: providing a mold having a first surface; forming a plurality of first concave shapes on the first surface of the mold to change the first surface of the mold to a second surface of the mold, wherein the plurality of first concave shapes are configured for making corresponding convex regions having a first haze $H_1$; forming a plurality of second shapes on the plurality of first concave shapes to change the second surface of the mold to a third surface of the mold; and using the third surface of the mold to emboss a film on a substrate to form a composite structure corresponding to the combination of the plurality of first concave shapes and the plurality of second shapes, wherein the composite structure has a second haze $H_2$, wherein $H_2/H_1$ is less than 2.8.

In one embodiment, the present invention discloses an optical sheet, comprising: a substrate having a first surface and a second surface opposite to the first surface; and a film having a third surface and a fourth surface opposite to the third surface, wherein the third surface of the film is on the first surface of the substrate and the fourth surface of the film comprises a structure corresponding to a combination of a plurality of first convex shapes and a plurality of second convex or concave shapes superimposed on the plurality of first convex shapes.

The detailed technology and above preferred embodiments implemented for the present invention are described in the following paragraphs accompanying the appended drawings for people skilled in this field to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE ILLUSTRATED EMBODIMENTS

The detailed explanation of the present invention is described as following. The described preferred embodiments are presented for purposes of illustrations and description and they are not intended to limit the scope of the present invention.

In the following context, the haze is measured based on the combination of the substrate and the composite structure (serving as light input surface) disposed on the substrate.

Figure 2A:
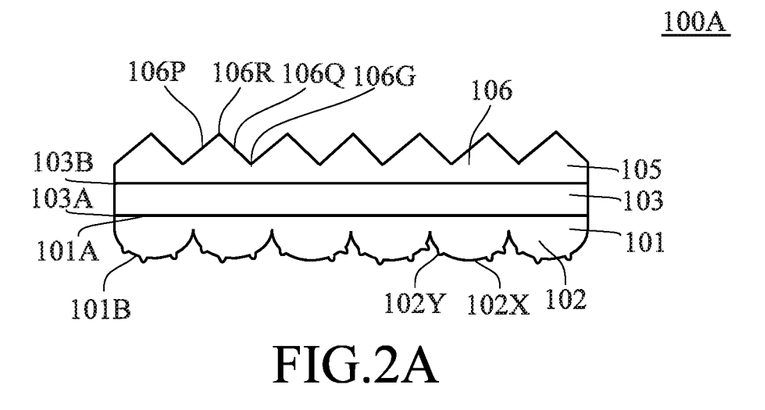
FIG. 2A to FIG. 2C respectively illustrate a schematic cross-sectional view of a first optical sheet, a schematic cross-sectional view of a second optical sheet and a schematic cross-sectional view of a third optical sheet in the present invention.
Figure 2B:
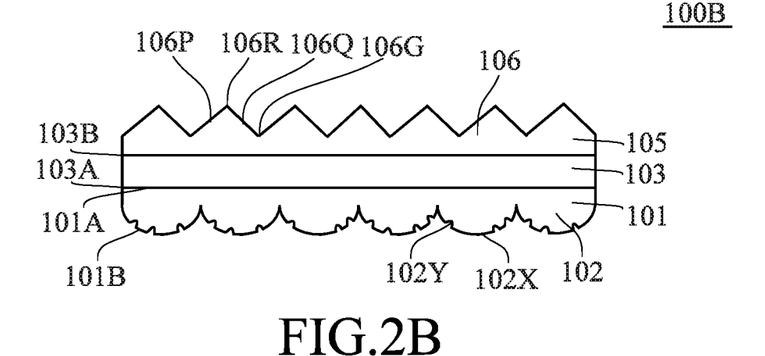
Figure 2C:
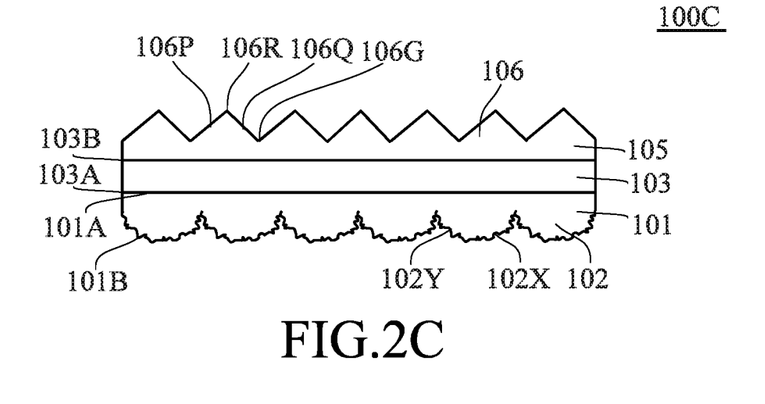

FIG. 2A to FIG. 2C respectively illustrate a schematic cross-sectional view of a first optical sheet 100A, a schematic cross-sectional view of a second optical sheet 100B and a schematic cross-sectional view of a third optical sheet 100C in the present invention. The optical sheet 100A, 100B, 100C comprises a substrate 103 and a film 101. The substrate 103 (e.g., PET substrate) has a first surface 103A and a second surface 103B opposite to the first surface 103A. The film 101 has a third surface 101A and a fourth surface 101B opposite to the third surface 101A, wherein the third surface 101A of the film 101 is on the first surface 103A of the substrate 103 and the fourth surface 101B of the film 101 comprises a composite structure 102 corresponding to a combination of a plurality of first convex shapes 102X and a plurality of second shapes 102Y superimposed on the plurality of first convex shapes 102X. The average size of the first convex shapes 102X is larger than the average size of the second shapes 102Y. The density of the second shapes 102Y is larger than the density of the first convex shapes 102X. In one embodiment, the fourth surface 101B of the film 101 comprises a composite structure 102 corresponding to a combination of a plurality of first convex shapes 102X and a plurality of second convex or concave shapes 102Y superimposed on the plurality of first convex shapes 102X. In the preferred embodiment, the fourth surface 101B of the film 101 comprises a composite structure 102 corresponding to a combination of a plurality of first lenticular shapes 102X and a plurality of second convex or concave shapes 102Y superimposed on the plurality of first lenticular shapes 102X. Preferably, the projection on the first surface 103A of the substrate 103 of each first lenticular shape 102X is elliptical. For increasing diffusion area, the adjacent first convex or lenticular shapes 102X overlap so as to have no space therebetween. In one embodiment, the average roughness (Ra) of the composite structure 102 is in a range from 0.2 μm to 0.8 μm, preferably in a range from 0.3 μm to 0.8 μm, and the haze of the composite structure 102 is in a range from 15% to 29% or in a range from 15% to 25%, preferably in a range from 15% to 22%, more preferably in a range from 17% to 20%. Each second shape 102Y is convex or concave relative to the corresponding first convex shape 102X (In the optical sheet 100A, each second shape 102Y is convex relative to the corresponding first convex shape 102X; in the optical sheet 100B, each second shape 102Y is concave relative to the corresponding first convex shape 102X; and in the optical sheet 100C, a portion of the second shapes 102Y are convex relative to the corresponding first convex shape 102X and another portion of the second shapes 102Y are concave relative to the corresponding first convex shape 102X.); however, the present invention is not limited to this case, for example, the second shape(s) 102Y roughed or textured relative to the corresponding first convex shape 102X can be applied, such as dents, lines, cracks, pits and protrusions, to increase diffusion effect. Each of the first convex shapes 102X has a larger smooth surface area (i.e. the density of the first convex shapes 102X is smaller) such that the slight superimposition/modification by the second shapes 102Y can destroy the regularity of the first convex shapes 102X but the composite structure 102 corresponding to the combination of the first convex shapes 102X and the second shapes 102Y can not obviously scatter light. Moreover, although the slight increment of the average roughness (Ra) resulting from the slight superimposition/modification by the second shapes 102Y increases the haze of the composite structure 102, the haze of the composite structure 102 is low enough to eliminate the reflective Newton's ring and the loss of the brightness is slighter. The substrate 103 has a light input surface 103A and a light output surface 103B opposite to the light input surface 103A, wherein the composite structure 102 is formed on the light input surface 103A. The composite structure 102 can have a plurality of particles therein. In one embodiment of the optical sheet 100A, 100C, each second shape 102Y convex relative to the corresponding first convex shape 102X can be formed by the corresponding particles protruding relative to the corresponding first convex shape 102X.

The optical sheet 100A, 100B, 100C can further comprise a light enhancement layer 105 disposed on the second surface 103B of the substrate 103. The light enhancement layer 105 can comprise a plurality of microstructures 106 (e.g., prisms or microlens, preferably, each microstructure is a prism). For example, the light enhancement layer 105 comprises a plurality of prisms 106 extending substantially along a first direction. The first direction can be the length direction of the prism 106, preferably perpendicular to the width direction (e.g., the cross-section direction) of the prism 106. The prism 106 can have a linear length, a meandering length or a wave length. The opposing facets 106P, 106Q of each prism 106 intersect to form the ridge 106R (or peak, apex) of the prism 106. The facets of the adjacent prisms 106 intersect to form the groove 106G (or valley). The height of the ridge 106R of the prism 106 can varies along the first direction. Preferably, the dihedral angle defined by the opposing facets 106P, 106Q of the prism 106 can be the same through the entire prism 106.

FIG. 3A to FIG. 3D illustrate a preferable manufacturing method for forming the optical sheet 100A, 100B, 100C in the present invention. However, the present invention is not limited to this case. Compared with single mold-cutting processes, the present invention adopts two different mold-cutting processes to form the composite structure 102 which has better anti-Newton's ring performance and better brightness. For convenience of explanation, only the manufacturing method for forming the optical sheet 100A is illustrated.

Figure 3A:
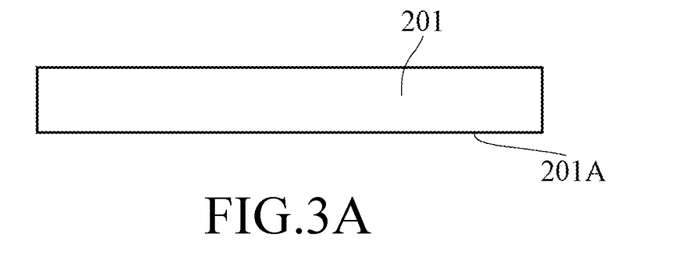
FIG. 3A to FIG. 3D illustrate a preferable manufacturing method for forming the optical sheet in the present invention.
Figure 3B:
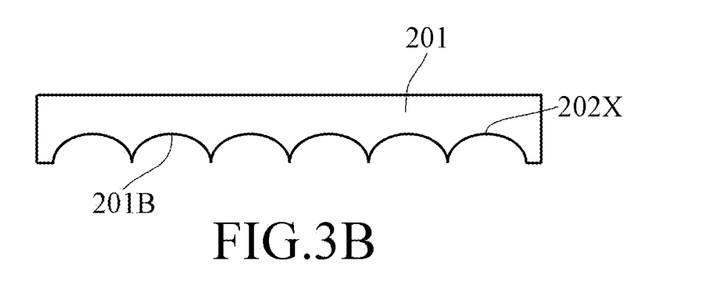

Mold-Cutting Processes I:

In the beginning, provide a mold 201 having a first surface 201A (see FIG. 3A). Form a plurality of first concave shapes 202X on the first surface 201A of the mold 201 to change the first surface 201A of the mold 201 to a second surface 201B of the mold 201 (see FIG. 3B). Preferably, the hard tool can be used to penetrate into the first surface 201A of the mold 201 to form a plurality of first concave shapes 202X on the first surface 201A of the mold 201 (preferably, the mold 201 is a roll used in the FTS (Fast Tool Server) process.). The hard tool can be a knife having a smoothly-curved shape such that each of the first concave shapes 202X have a smoothly-curved shape (completely smoothly-curved shape is preferable). Preferably, the front end of the hard tool has a round shape.

Figure 4:
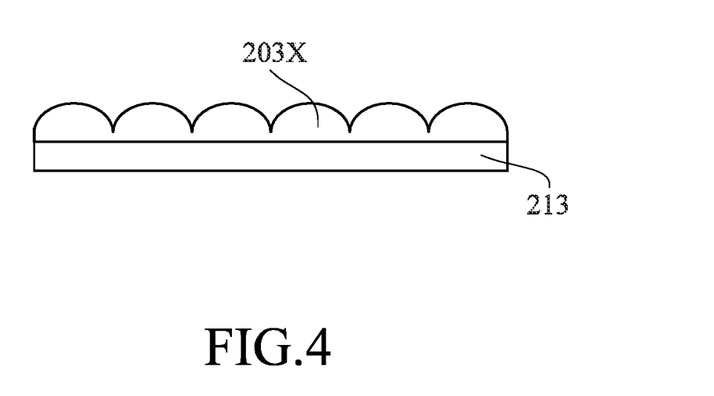
FIG. 4 illustrate that the first concave shapes are configured for making corresponding convex regions having a first haze $H_1$.

The first concave shapes 202X are configured for making corresponding convex regions 203X having a first haze $H_1$ (see FIG. 4). The first haze $H_1$ is in a range from 6% to 13%. In fact, the corresponding convex regions 203X may be not formed/embossed in the present invention and a structure merely for evaluating the first haze $H_1$. Each of the corresponding convex regions 203X is lump-shaped for two dimensional light-diffusing. Each of the corresponding lump-shaped convex regions 203X can have a smooth-curved surface (completely smoothly-curved shape is preferable); preferably, each of the corresponding convex regions 203X is a lenticular lens. Each of the lenticular lenses 203X is ellipse-shaped and has a maximum dimension in the cutting direction of the hard tool. The adjacent convex regions or lenticular lenses 203X have a space therebetween; however, for increasing the diffusing area, it is preferable that the adjacent convex regions or lenticular lenses 203X overlay so as to have no space therebetween. The average roughness (Ra) of the corresponding convex regions 203X is in a range from 0.2 µm to 0.7 µm. In one embodiment, the average roughness (Ra) of the corresponding convex regions 203X is in a range from 0.25 µm to 0.6 µm. In the preferred embodiment, the average roughness (Ra) of the corresponding convex regions 203X is in a range from 0.3 µm to 0.5 µm.

Figure 3C:
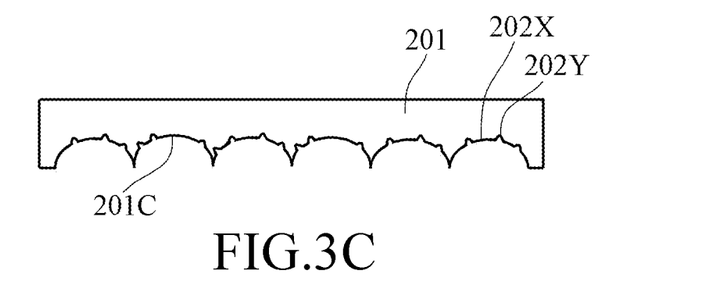
Figure 3D:
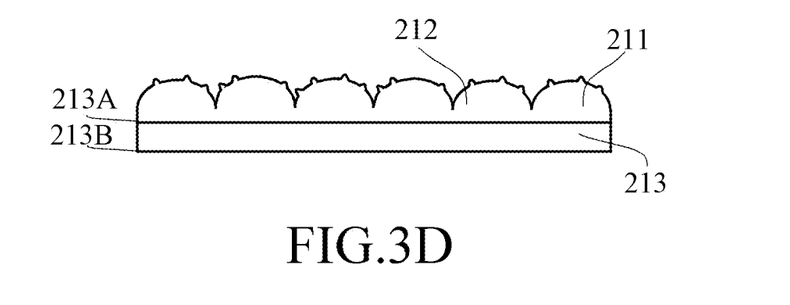

Mold-Cutting Processes II:

Form a plurality of second shapes 202Y on the plurality of first concave shapes 202X to change the second surface 201B of the mold 201 to a third surface 201C of the mold 201 (see FIG. 3C). Preferably, perform a sandblasting process to form a plurality of second shapes 202Y on the plurality of first convex shapes 202X such that the second surface 201B of the mold 201 is changed to the to the third surface 201C of the mold 201; however, the present invention is not limited to this case, such as deposition process. The average size of the first concave shapes 202X is larger than the average size of the second shapes 202Y. The density of the second shapes 202Y is larger than the density of the first concave shapes 202X. Each of the second shapes 202Y is convex or concave relative to the second surface 201B of the mold 201; however, the present invention is not limited to this case, for example, the second shape(s) 202Y roughed or textured relative to the first concave shapes 202X can be applied to the first concave shapes 202X, such as dents, lines, cracks, pits and protrusions, to increase diffusion effect.

Figure 5A:
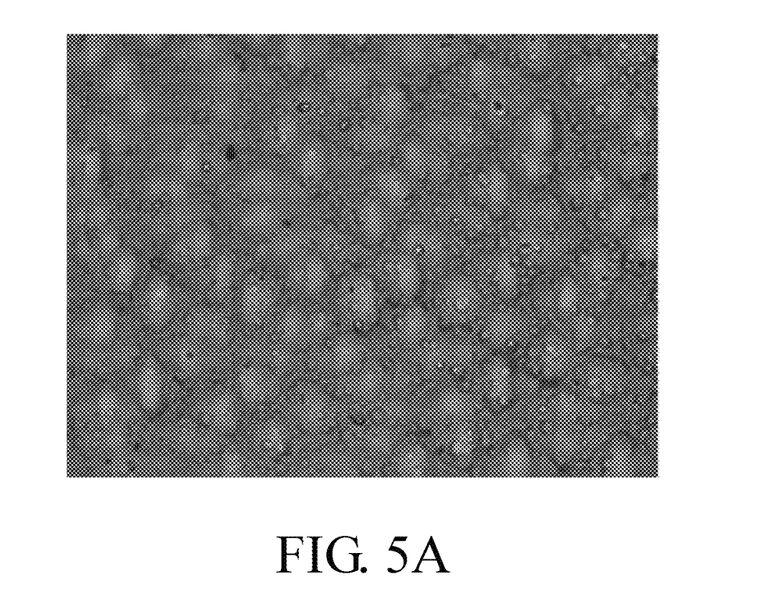
FIG. 5A to FIG. 5B illustrate a real composite structure corresponding to the combination of a plurality of first convex shapes and a plurality of second shapes.
Figure 5B:
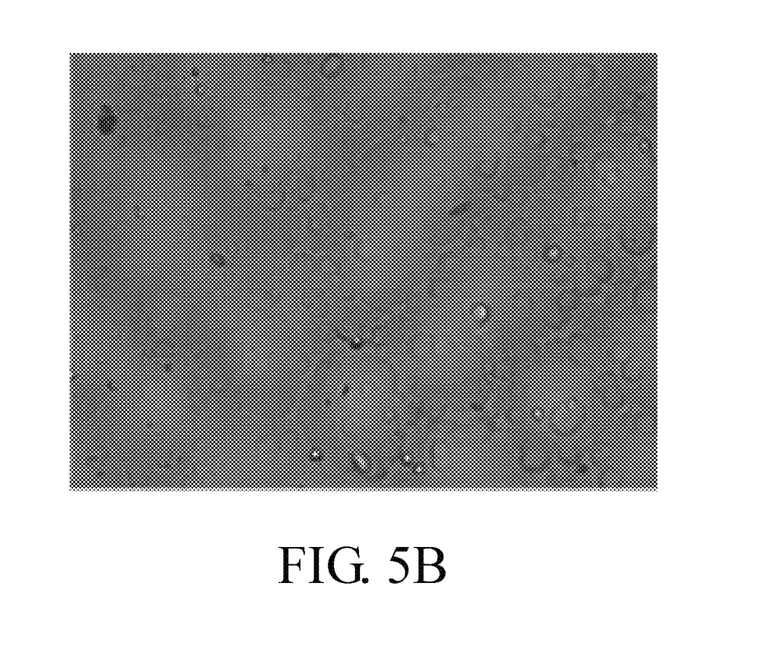
Figure 6:
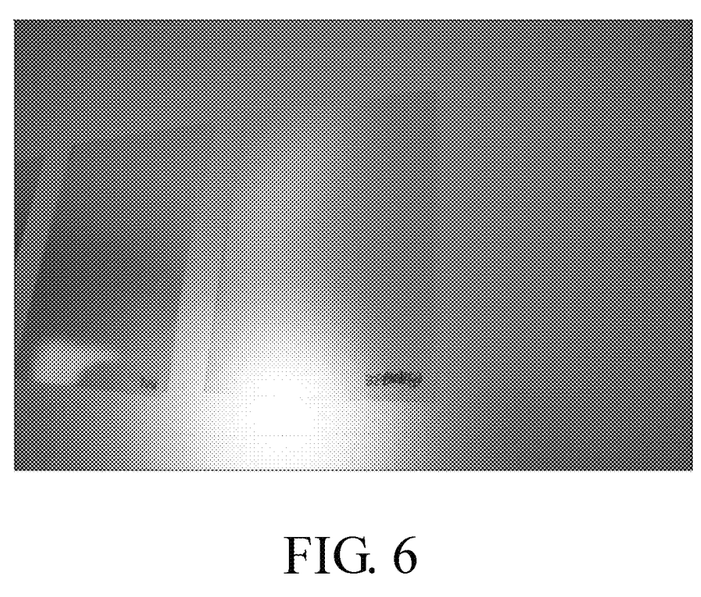
FIG. 6 illustrates the composite structure can eliminate Newton's ring (especially reflective Newton's ring).

Use the third surface 201C of the mold 201 to emboss a film 211 on a substrate 213 to form a composite structure 212 corresponding to the combination of the plurality of first concave shapes 202X and the plurality of second shapes 202Y (see FIG. 3D), wherein the composite structure 212 has a second haze $H_2$. The substrate 213 has a light input surface 213A and a light output surface 213B opposite to the light input surface 213A, wherein the composite structure 212 is formed on the light input surface 213A. In the present invention, Mold-Cutting Processes I (the FTS process is preferable) is used to form the second surface 201B of the mold 201 having a plurality of first concave shapes 202X (preferably, the first average roughness (Ra) $R_1$ of the corresponding convex regions 203X is in a range from 0.2 µm to 0.7 µm, a range from 0.25 µm to 0.6 µm or a range from 0.3 µm to 0.5 µm and the first haze $H_1$ is in a range from 6% to 13%) and Mold-Cutting Processes II (the sandblasting process is preferable) is used to slightly modify the first concave shapes 202X. Each of the first concave shapes 202X of the second surface 201B of the mold 201 has a larger smooth surface area (i.e. the density of the first concave shapes 202X is smaller) such that the slight modification by the second shapes 202Y can destroy the regularity of the first concave shapes 202X but the composite structure 212 corresponding to the combination of the first concave shapes 202X and the second shapes 202Y can not obviously scatter light. Moreover, although the slight increment of the average roughness (Ra) resulting from the slight modification by the second shapes 202Y increases the haze of the composite structure 212 (form the first haze $H_1$ to the second haze $H_2$), $H_2/H_1$ is low (e.g., less than 2.8) enough to eliminate the reflective Newton's ring and the loss of the brightness is slighter (e.g., the loss of the brightness is less than 5%, 4%, 3%, 2% or 1%) or $H_2$ is low (compared with the structure formed by single mold-cutting process) enough to eliminate the reflective Newton's ring and the loss of the brightness is slighter (e.g., the loss of the brightness is less than 5%, 4%, 3%, 2% or 1%). In one embodiment, $H_2/H_1$ is less than 2.5. In one embodiment, $H_2/H_1$ is less than 2.25. In the preferred embodiment, $H_2/H_1$ is less than 2. Also, although the slight modification by the second shapes 202Y increases the average roughness (Ra) of the composite structure 212 (form the first average roughness (Ra) $R_1$ to the second average roughness (Ra) $R_2$), ($R_2-R_1$) is low (e.g., less than 0.2 µm) enough to eliminate the reflective Newton's ring and the loss of the brightness is slighter (e.g., the loss of the brightness is less than 5%, 4%, 3%, 2% or 1%). In one embodiment, ($R_2-R_1$) is less than 0.15 µm. In the preferred embodiment, ($R_2-R_1$) is less than 0.1 µm. The second average roughness (Ra) $R_2$ of the composite structure 212 is in a range from 0.3 µm to µm. The second haze $H_2$ is in a range from 15% to 22%; preferably, the second haze $H_2$ is in a range from 17% to 20%. FIG. 5A to FIG. 5B illustrate a real composite structure corresponding to the combination of a plurality of first convex shapes and a plurality of second shapes. FIG. 6 illustrates the composite structure can eliminate Newton's ring (especially reflective Newton's ring).

EXPERIMENTS

The optical measurement result for the embossed film formed by different processes are listed in Table 1. The embossed film of the Samples 1 to 2 are formed only by the FTS process. The embossed film of the Samples 3 to 4 are formed only by the sandblasting process. The embossed film 211/the composite structure 212 of the Sample 5 is formed by the process in the present invention.

TABLE 1

|  | Ra(μm) | Haze(%) | Performance of Anti-Reflective-Newton's Ring | Performance of Anti-Transimissive-Newton's Ring | Brightness(%) |
|---|---|---|---|---|---|
| Sample 1 | 0.390 | 10 | General | Worse | 100 |
| Sample 2 | 0.610 | 35 | Worse | Better | 95 |
| Sample 3 | 0.120 | 10 | Worse | Worse | 98 |
| Sample 4 | 0.310 | 34 | Better | Better | 93 |
| Sample 5 | 0.430 | 18 | Better | Better | 99 |

From Table 1; for the embossed film of the Samples 3 to 4 formed only by the sandblasting process, increasing the average roughness (Ra) can eliminate the transmissive Newton's ring and the reflective Newton's ring, but the brightness drops a lot from 98% to 93%; for the embossed film of the Samples 1 to 2 formed only by the FTS process, increasing the average roughness (Ra) or the haze can eliminate the transmissive Newton's ring and slightly reduce the brightness, but the reflective Newton's ring occurs. By the process in the present invention, the embossed film 211/the composite structure 212 of the Samples 5 has both the better performance of anti-Newton's ring and brightness.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method of forming an optical sheet, comprising:
   providing a mold having a first surface;
   forming a plurality of first concave shapes on the first surface of the mold such that the first surface of the mold is changed to a second surface of the mold, wherein each two adjacent first concave shapes overlap with each other;
   forming a plurality of second shapes on the plurality of first concave shapes such that the second surface of the mold is changed to a third surface of the mold, wherein the average size of the plurality of first concave shapes is larger than the average size of the plurality of second shapes; and
   using the third surface of the mold to emboss a film on a substrate to form a composite structure corresponding to a combination of the plurality of first concave shapes and the plurality of second shapes, wherein the average roughness (Ra) of the composite structure is in a range from 0.3 μm to 0.8 μm 0.3-0.8 μm.

2. The method according to claim 1, wherein the plurality of first concave shapes are configured for making corresponding convex regions, wherein the average roughness (Ra) of the corresponding convex regions of the plurality of first concave shapes is symbolized as $R_1$ and the average roughness (Ra) of the composite structure is symbolized as $R_2$, wherein ($R_2-R_1$) is less than 0.2 μm.

3. The method according to claim 2, wherein ($R_2-R_1$) is less than 0.15 μm.

4. The method according to claim 3, wherein ($R_2-R_1$) is less than 0.1 μm.

5. The method according to claim 1, wherein forming the plurality of first concave shapes on the first surface of the mold is performed by using a hard tool to penetrate into the first surface of the mold and forming the plurality of second shapes on the plurality of first concave shapes is performed by a sandblasting process.

6. The method according to claim 5, wherein the plurality of first concave shapes are configured for making corresponding convex regions, wherein the average roughness (Ra) of the corresponding convex regions of the plurality of first concave shapes is symbolized as $R_1$ and the average roughness (Ra) of the composite structure is symbolized as $R_2$, wherein ($R_2-R_1$) is less than 0.2 μm.

7. The method according to claim 6, wherein ($R_2-R_1$) is less than 0.15 μm.

8. The method according to claim 7, wherein ($R_2-R_1$) is less than 0.1 μm.

9. The method according to claim 5, wherein each of the plurality of second shapes is convex or concave relative to the second surface of the mold.

10. A method of forming an optical sheet, comprising:
    providing a mold having a first surface;
    forming a plurality of first concave shapes on the first surface of the mold by an FTS (Fast Tool Server) process such that the first surface of the mold is changed to a second surface of the mold, wherein each two adjacent first concave shapes overlap with each other;
    forming a plurality of second shapes on the plurality of first concave shapes such that the second surface of the mold is changed to a third surface of the mold, wherein the average size of the plurality of first concave shapes is larger than the average size of the plurality of second shapes; and
    using the third surface of the mold to emboss a film on a substrate to form a composite structure corresponding to a combination of the plurality of first concave shapes and the plurality of second shapes, wherein the average roughness (Ra) of the composite structure is in a range from 0.3 μm to 0.8 μm.

11. The method according to claim 10, wherein forming the plurality of second shapes on the plurality of first concave shapes is performed by a sandblasting process.

12. The method according to claim 10, wherein each of the plurality of second shapes is convex or concave relative to the second surface of the mold.

13. A method of forming an optical sheet, comprising:
    providing a mold having a first surface;
    forming a plurality of first concave shapes on the first surface of the mold by an FTS (Fast Tool Server) process such that the first surface of the mold is changed to a second surface of the mold, wherein each two adjacent first concave shapes overlap with each other;
    forming a plurality of second shapes on the plurality of first concave shapes such that the second surface of the mold is changed to a third surface of the mold, wherein the average size of the plurality of first concave shapes is larger than the average size of the plurality of second shapes; and
    using the third surface of the mold to emboss a film on a substrate to form a composite structure corresponding to a combination of the plurality of first concave shapes and the plurality of second shapes;
    wherein the plurality of first concave shapes are configured for making corresponding convex regions having a first average roughness (Ra) $R_1$, and the composite structure has a second average roughness (Ra) $R_2$, wherein $R_2$ is in a range from 0.3 μm to 0.8 μm 0.3-0.8 μm and ($R_2-R_1$) is less than 0.2 μm.

14. The method according to claim 13, wherein ($R_2-R_1$) is less than 0.15 μm.

15. The method according to claim 14, wherein ($R_2-R_1$) is less than 0.1 μm.

16. The method according to claim 13, wherein forming the plurality of second shapes on the plurality of first concave shapes is performed by a sandblasting process.

17. The method according to claim 13, wherein each of the plurality of second shapes is convex or concave relative to the second surface of the mold.

\* \* \* \* \*